United States Patent
Kato

(10) Patent No.: US 9,031,780 B2
(45) Date of Patent: May 12, 2015

(54) NAVIGATION APPARATUS

(75) Inventor: Seiji Kato, Toyota (JP)

(73) Assignee: DENSO CORPORATION, Kariya (JP)

( * ) Notice: Subject to any disclaimer, the term of this patent is extended or adjusted under 35 U.S.C. 154(b) by 1520 days.

(21) Appl. No.: 12/379,739

(22) Filed: Feb. 27, 2009

(65) Prior Publication Data

US 2009/0228206 A1   Sep. 10, 2009

(30) Foreign Application Priority Data

Mar. 4, 2008   (JP) .................................. 2008-53241

(51) Int. Cl.
G01C 21/32 (2006.01)
G01C 21/36 (2006.01)

(52) U.S. Cl.
CPC ........ G01C 21/3658 (2013.01); *G01C 21/3632* (2013.01)

(58) Field of Classification Search
CPC .................................................. G01C 21/3632
USPC ......................................................... 701/200
See application file for complete search history.

(56) References Cited

U.S. PATENT DOCUMENTS

| | | | |
|---|---|---|---|
| 6,108,604 A | 8/2000 | Fukaya et al. | |
| 6,151,552 A * | 11/2000 | Koizumi et al. | 701/428 |
| 6,560,533 B2 * | 5/2003 | Sugawara et al. | 701/431 |
| 6,934,627 B2 * | 8/2005 | Kawakami et al. | 701/437 |
| 7,788,031 B2 * | 8/2010 | Mikame | 701/411 |
| 2001/0041962 A1 | 11/2001 | Sugawara et al. | |
| 2004/0093153 A1 * | 5/2004 | Buth et al. | 701/200 |
| 2005/0149262 A1 * | 7/2005 | Oikubo | 701/211 |
| 2006/0195257 A1 * | 8/2006 | Nakamura | 701/211 |
| 2006/0217882 A1 * | 9/2006 | Takashima et al. | 701/208 |
| 2007/0055444 A1 | 3/2007 | Mikame | |

FOREIGN PATENT DOCUMENTS

JP   A-2005-156278   6/2005

OTHER PUBLICATIONS

Notice of Reason for Refusal issued from the Japanese Patent Office on Dec. 22, 2009 in the corresponding Japanese patent application No. 2008-053241 (with English translation).

* cited by examiner

*Primary Examiner* — Elaine Gort
*Assistant Examiner* — Jonathan K Ng
(74) *Attorney, Agent, or Firm* — Posz Law Group, PLC

(57) ABSTRACT

When an exit road from a rotary is a road inside of the rotary, a right/left turn branch display is performed instead of performing a rotary guidance display. Thus, a driver is enabled to correctly recognize the exit road which advances inward of the rotary.

5 Claims, 3 Drawing Sheets

NAVIGATION APPARATUS

CROSS REFERENCE TO RELATED APPLICATION

This application is based on and incorporates herein by reference Japanese Patent Application No. 2008-53241 filed on Mar. 4, 2008.

FIELD OF THE INVENTION

The present invention relates to a navigation apparatus having a route guidance function to navigate a vehicle along a route from a departure point to a destination.

BACKGROUND OF THE INVENTION

Patent document 1: JP-H11-51684 A corresponding to U.S. Pat. No. 6,108,604
Patent document 2: JP-2001-317956 A corresponding to US-2001/0041962

Conventionally, a navigation apparatus has a route guidance function to navigate a driver of a vehicle along a route from a departure point to a destination.

The driver can drive the vehicle based on the route guidance to thereby reach a destination without getting lost. A route to a destination may include a rotary (or called a traffic circle) as a guidance target. Such a rotary often has a configuration more complicated than that of a typical intersection; thereby, if a rotary is included in a guidance route, it may be difficult for a driver or user to confirm an exit route from the rotary. Accordingly, when performing a route guidance in a rotary, a display style is changed from a right/left turn branch display for performing a usual road guidance other than a rotary to a rotary guidance display for indicating an exit route using a picture or image representing a configuration of the exit route.

Such a rotary guidance display is provided in a navigation apparatus disclosed in Patent document 1 or Patent document 2 while adopting a method for indicating a road via which a vehicle should exit from the rotary. Patent document 1 adopts a technique to determine a branch direction from a relative direction between a road entering a rotary and a road exiting the rotary. Patent document 2 adopts a technique to indicate what number an exit road is after entering a rotary.

In the above rotary guidance display in Patent document 1 and Patent document 2, an entrance road and an exit road of a rotary are always illustrated by a rotary guidance display. Herein, the rotary guidance display cannot illustrate an exit road or exit route inside the rotary. For instance, a turn by turn (TbT) function is provided which can display only a picture of a specific pattern stored in a map disk or microcomputer. In such a turn by turn function, only a picture to illustrate an exit route advancing outward of a rotary is prepared; thus, when an exit road from the rotary advances inward of the rotary, such an exit road advancing inward of the rotary cannot be displayed inside of the rotary. Accordingly, the driver may not be provided with a correct route guidance in a rotary having an exit route advancing inward of the rotary.

SUMMARY OF THE INVENTION

It is an object of the present invention to provide a technology in which when an exit road of a rotary is inside of the rotary, a driver is enabled to appropriately recognize the exit road being inside of the rotary.

As an example of the present invention, a navigation apparatus for a vehicle is provided as follows. The navigation apparatus has a function to perform a route guidance by displaying a guidance route from a departure point to a destination on a map. The navigation apparatus is further provided as follows. A map data input section is configured to input map data stored in a storage medium. A control section is configured to retrieve as a guidance route a route from the departure point to the destination based on the map data while performing a route guidance relative to the guidance route. Herein, the control section comprises: a rotary inside determination portion, a rotary guidance display portion, and a right/left turn branch display portion. The rotary inside determination portion is configured to, when a rotary is included in the guidance route, determine whether an exit route, which exits from the rotary, is a road which advances inside of the rotary. The rotary guidance display portion is configured to perform a rotary guidance display for indicating the exit route by using a picture illustrating a configuration of the rotary when it is determined that the exit route is not a road advancing inside of the rotary. The right/left turn branch display portion is configured to perform a right/left turn branch display for indicating a right turn or a left turn at an intersection when it is determined that the exit route from the rotary is a road advancing inside of the rotary.

As an example of the present invention, a method is provided for navigating a vehicle along a guidance route including a rotary based on map data. The method comprises: (i) determining, when a rotary is included in the guidance route, whether an exit route, which exits from the rotary, is a road which advances inside of the rotary; (ii) performing a rotary guidance display for indicating the exit route by using a picture illustrating a configuration of the rotary when it is determined that the exit route is not a road advancing inside of the rotary; and (iii) performing a right/left turn branch display for indicating a right turn or a left turn at an intersection when it is determined that the exit route from the rotary is a road advancing inside of the rotary.

Under the configuration of the above examples, when an exit road exiting from a rotary exit is a road inside of the rotary, a right/left turn branch display is performed instead of performing a rotary guidance display. Thus, a driver is enabled to correctly recognize the exit road which advances inward of the rotary.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

The following describes an embodiment of the present invention with reference to drawings.

Figure 1:
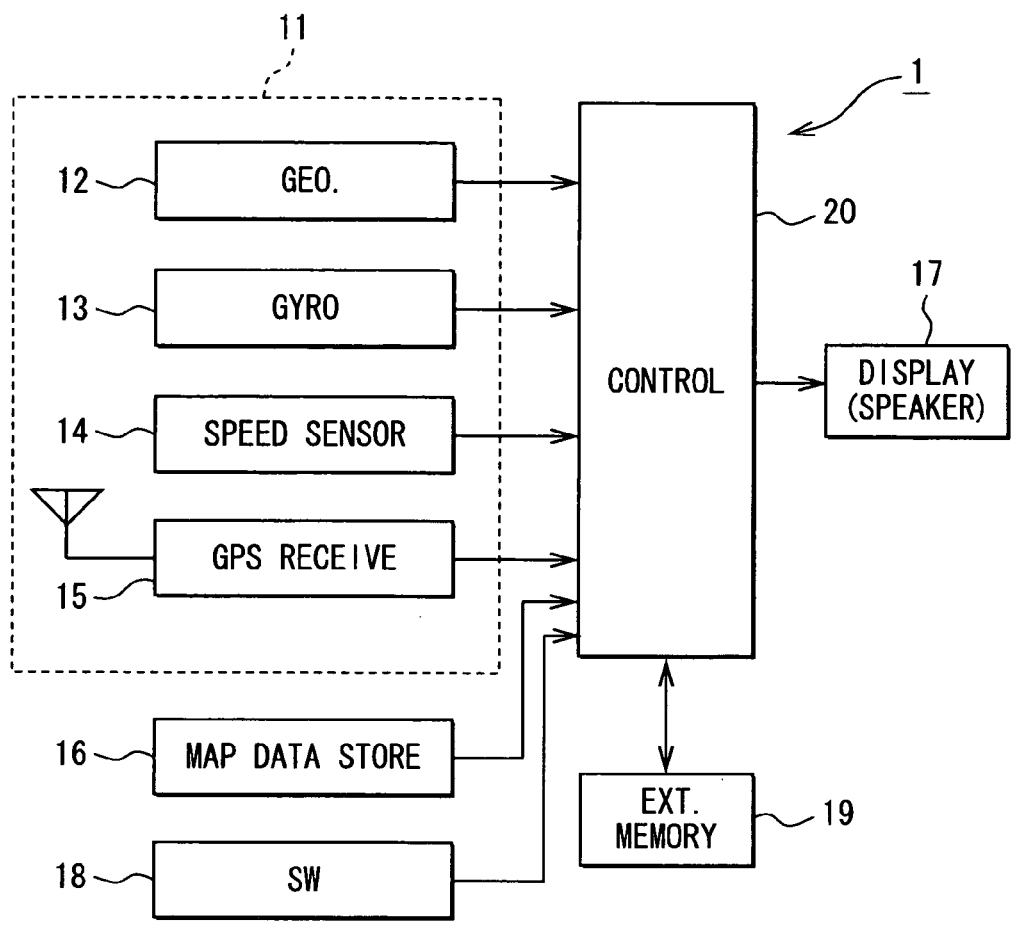
FIG. 1 is a block diagram illustrating a configuration of a navigation apparatus according to an embodiment of the present invention.

The following describes an embodiment of the present invention. FIG. 1 is a block diagram showing a configuration of an in-vehicle navigation apparatus mounted in a vehicle according to an embodiment of the present invention.

As illustrated in FIG. 1, the navigation apparatus 1 includes the following: a position detection section 11, a map data storage section 16, a display section 17, an operation switch group 18, an external memory 19, and a control section 20 connected to the foregoing.

The position detection section 11 includes the following known sensors: a geomagnetic sensor 12, a gyroscope 13, a wheel speed sensor 14, and a GPS receiver 15 for GPS (Global Positioning System) which detects a present position of the vehicle based on electric waves from satellites. The position detection section 11 outputs detection signals from the sensors 12 to 15 to the control section 20 as present position information. The sensors 12 to 15 have different types of errors from each other; thus, the sensors 12 to 15 have roles to complement each other. In addition, depending on the accuracy of each sensor 12 to 15, only part of the sensors 12 to 15 may be included in the position detection section 11. Further, a rotation sensor of steering, a wheel speed sensor of each driving wheel, etc. (none shown) may be added in the position detection section 11.

The map data storage section 16, which functions as a map data input section, stores the various data including map data and inputs the various data to the control section 20. The map data contains, for instance, road data for indicating nodes and links, and map matching data for improving position detection. The map data storage section 16 generally includes a CD-ROM, DVD, or hard disk drive because of required data volume. In contrast, other media such as a memory card may be included.

The display section 17 includes a color display device having a display screen and a speaker for outputting sounds. The display section 17 displays video images on the display screen of the color display device based on a video signal inputted from the control section 20. For example, the video images include videos of a map surrounding a present position and a road which is used in a route guidance. The display section 17 further outputs via the speaker a sound corresponding to an audio signal inputted from the control section 20. The color display device includes a CRT, liquid crystal display, and plasma display, for example. In addition, in the above, the color display device is exemplified as the display section 17. However, without being limited to such a display device, for instance, an image projection device may be included as the display section 17 which projects images onto a head up display (HUD) having as a display screen a windshield in the front of the vehicle. In addition, although the above display section 17 serves also as a sound generation section, another device may be separately provided which generates sounds.

The operation switch group 18 includes input switches, such as multiple pushbutton switches (mechanical switches) prepared in a periphery of the display screen in the display section 17, and a touch panel formed on the display screen in superimposition. The operation switch group 18 outputs a switch signal based on turning on and off of the pushbutton switch or operation of the touch panel by the user to the control section 20.

The external memory 19 is provided in a storage section prepared apart from the inside of the control section 20, and includes a ROM or RAM to store the various kinds of data and programs.

The control section 20 is a usual computer to contain a CPU, a ROM, a RAM, an I/O, and a bus line connected with the foregoing. The CPU of the control section 20 reads from the ROM a program for operating the navigation apparatus 1 and executes the read program to thereby execute a process for a map information display and an audio guidance based on the various data stored in the map data storage section 16 and the external memory 19. In the above execution of the program, the CPU receives required information (signals) from the position detection section 11, the map data storage section 16, the operation switch group 18, and the external memory 19, via the I/O. Based on the above program, the CPU executes various operations or writing a variety of information such as present position information and destination information to the RAM, and executes a map display and an audio guidance via the display section 17.

The CPU of the control section 20 executes based on programs the following processes: a present position designation process, a map display process, a destination designation process, a guidance route calculation process, a route guidance process, etc.

The present position designation process is to designate a present position (e.g., longitude and latitude) and heading direction (east, west, south, and north) of the vehicle based on signals from the position detection section 11 using a technology such as well-known map matching.

The destination designation process is to designate a destination as a target of route guidance based on the operation via the operation switch group 18 by a user.

The guidance route calculation process is to calculate an optimal guidance route from a present position to a destination designated by the destination designation process.

For example, first, a departure point is registered as the first node. Among all the nodes connected to each link connected to the first node, a node having a smallest cost is selected in order. The guidance route is thus obtained. Herein, the cost signifies an amount of weighting in selecting an optimal route.

The route guidance process reads out map data from the map data storage section 16 and obtains image data in which the calculated guidance route, destination, passing point, and present position are superimposed on a map indicated by the read map data. In addition, the route guidance process obtains image data (i.e., right/left turn branch display) for indicating a right turn, left turn, or the like, when needed, for instance, when the vehicle approaches an intersection where a guidance is necessary. The route guidance process then outputs the image data and an audio guidance signal for right/left turn to the display section 17.

Thus, under the above configuration, based on the map data read from the map data storage section 16 and the present position information inputted from the position detection section 11, the control section 20 of the navigation apparatus 1 executes the followings: a map display function to display on the display screen of the display section 17 a vehicle present position mark on the map in superimposition; a right/left turn branch display function to indicate a right turn or left turn by superimposing a right/left turn display on the map to follow the guidance route; an audio guidance function to perform an audio guidance for right/left turn, etc.

Next, a process executed by the navigation apparatus 1 is explained below. However, the present position designation process, the destination designation process, the guidance route calculation process, and the route guidance process of the navigation apparatus 1 are the same as usual and well-known. Thus the following explains as a featured part of the present embodiment a rotary guidance determination process included in the route guidance process.

Figure 2:
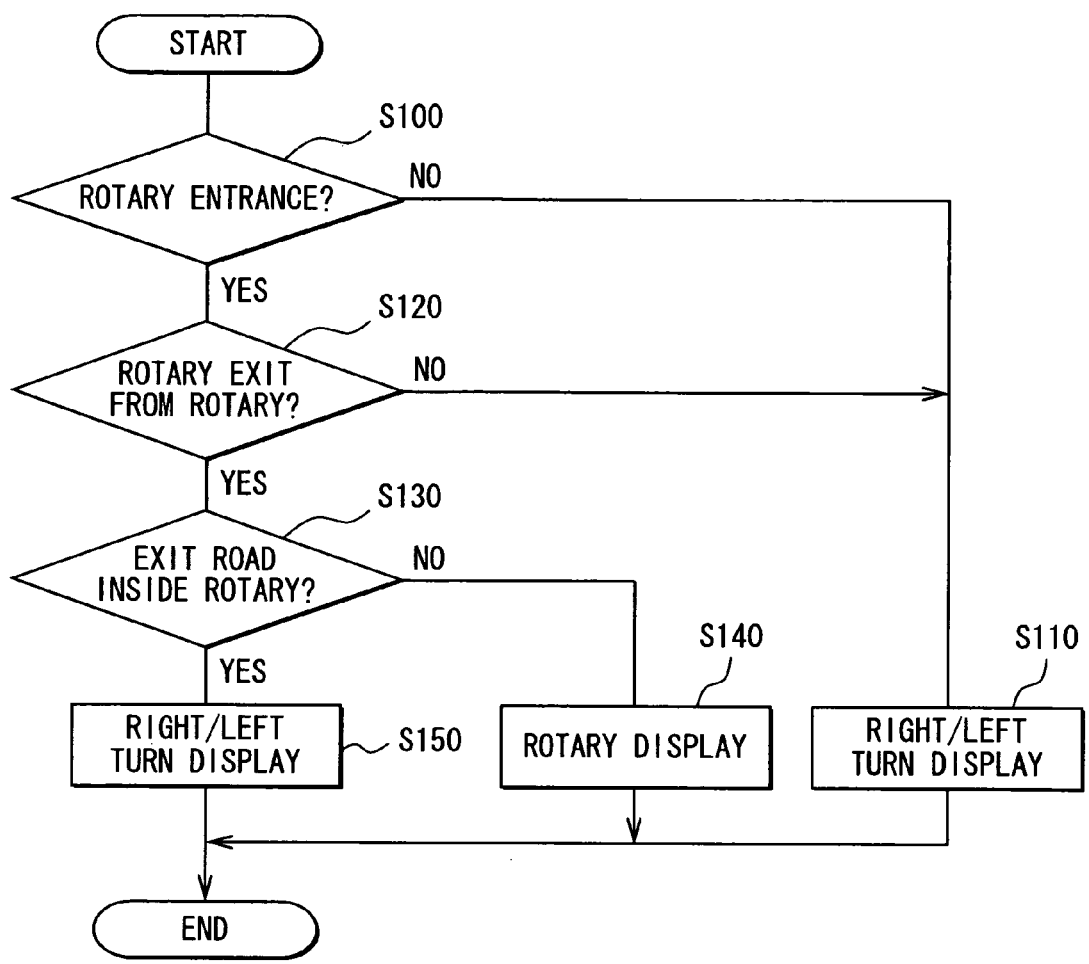
FIG. 2 is a flowchart of a rotary guidance determination process in a route guidance process performed by a control section of the navigation apparatus.

The rotary guidance determination process is executed as one process in the route guidance process. When a route calculated by the guidance route calculation process is displayed as a guidance route and the guidance route includes a rotary, the rotary guidance determination process is to determine what kind of display style is to be adopted. FIG. 2 is a flowchart of a rotary guidance determination process in a route guidance process performed by the control section 20. The details of the rotary guidance determination process are explained based on FIG. 2. The present process is executed for every determination target point encountered when tracing the route, which is calculated by the guidance route calculation process, forward towards the destination. In addition, the determination target point is a point currently designated on a road in the map data; for example, a node corresponds to the determination target point. Accordingly, the rotary guidance determination process is executed for every node included in the guidance route.

First, at S100, it is determined whether a determination target point is a rotary entrance. This determination is executed based on route information etc. which are stored in the map data. For example, when a rotary is included in the guidance route, it is determined whether a node presently regarded as the determination target point corresponds to a rotary entrance in the guidance route.

If the determination at S100 is negated, the processing proceeds to S110, where a right/left turn branch display is executed which is executed at a usual guidance for a road other than a rotary. Thus, a right/left turn branch display is executed as being superimposed on the displayed map including a vehicle present position mark.

In contrast, when the determination at S100 is affirmed, the processing proceeds to S120, where it is determined whether a rotary exit is present which has a start point corresponding to the determination target point used for the determination at S100. In other words, it is determined whether there is a rotary exit which exits from the rotary after entering the rotary from the rotary entrance being presently regarded as the determination target point. For instance, a guidance route does not necessarily enter a rotary via a rotary entrance. Even after reaching a rotary entrance, a guidance route may not pass through a rotary instead of directly entering the rotary via the rotary entrance. Therefore, only when the determination at S120 is affirmed, the processing proceeds to S130. When the determination at S120 is negated, the processing proceeds to S110, where a right/left turn branch display mentioned above is executed.

At S130, it is determined whether an exit road of the rotary exit, which is determined to be present at S120, goes inward of the rotary (i.e., is inside of the rotary). This determination is performed based on the map data whether an exit route exists within an inside area of the rotary (i.e., within an outer peripheral line of the rotary). When the exit road of the rotary goes outward of the rotary (i.e., is outside of the rotary), the determination at S130 is negated. Thus, the processing proceeds to S140, where a rotary guidance display, which is usually performed when entering a rotary, is performed. When the exit road of the rotary exit goes inward of the rotary, the determination at S130 is affirmed. Thus, the processing proceeds to S150. At S150, instead of a rotary guidance display which is usually performed when entering a rotary, a right/left turn branch display is performed. When performing the right/left turn branch display, an audio signal may be outputted to the display section 17. Thus, an audio guidance may be performed for a right/left turn branch corresponding to the right/left turn branch display. Further, an audio guidance may be performed for indicating that, even though the right/left turn branch display is performed, a rotary is present ahead of the vehicle and an exit is inside of the rotary, or for indicating an exit number. Thus, the rotary guidance determination process is executed.

Figure 3A:
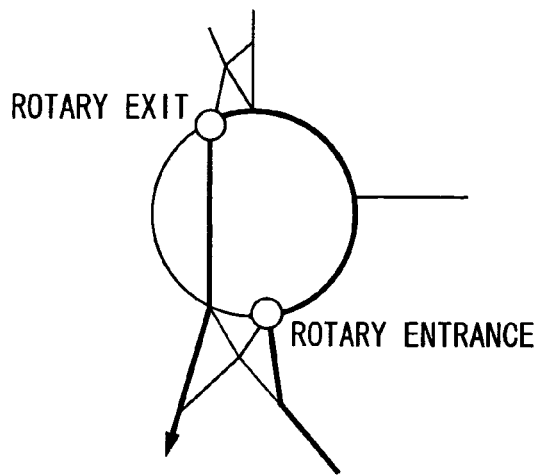
FIG. 3A is a schematic diagram illustrating a guidance route on a rotary configuration in case that an exit road is inside of the rotary.
Figure 3B:
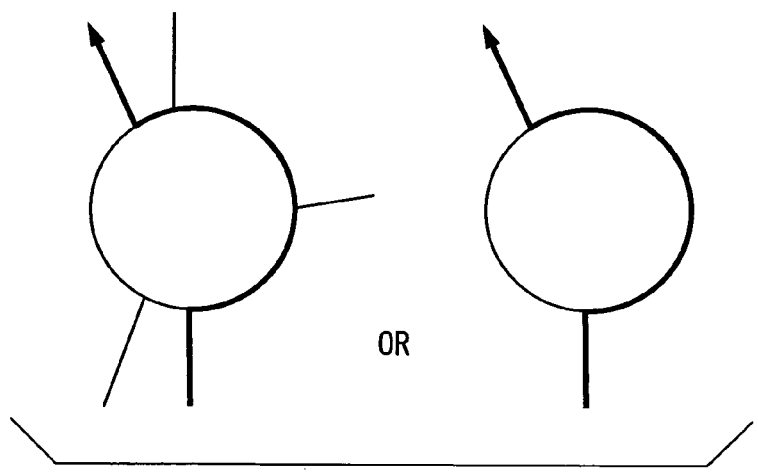
FIG. 3B illustrate a schematic diagram illustrating an example of a rotary guidance display when a rotary guidance determination is not performed.
Figure 3C:
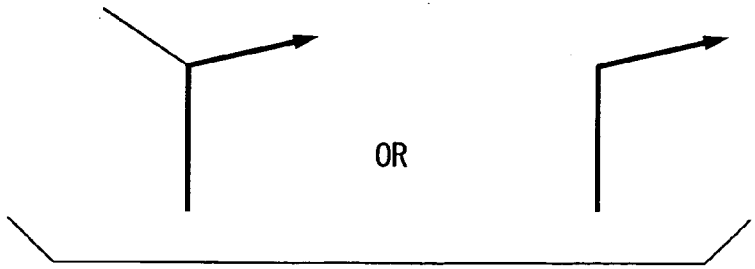
FIG. 3C illustrate a schematic diagram illustrating an example of a right/left turn branch display when a rotary guidance determination is performed.

FIGS. 3A to 3C are used for comparing with each other (i) the case where the above rotary guidance determination process is performed and (ii) the case where the above rotary guidance determination process is not performed. FIG. 3A is a schematic diagram illustrating a guidance route on a rotary configuration (i.e., planar configuration of the rotary) on map data stored in the navigation apparatus 1 in case that an exit road is inside of the rotary. FIG. 3B illustrate a schematic diagram illustrating an example of a rotary guidance display when a rotary guidance determination is not performed. FIG. 3C illustrate a schematic diagram illustrating an example of a right/left turn branch display when a rotary guidance determination is performed.

Now, assume the case illustrated in FIG. 3A, where an exit road of a rotary exit is a road inside of the rotary as indicated by a thick line arrow. If a rotary guidance display is adopted, a display is performed by a function of a turn by turn. Thus, a picture to indicate an exit route advancing outward of the rotary is only available. As indicated by a thick line arrow in FIG. 3B, although the actual exit road is a road inside of the rotary, the illustrated route indicates that a road outside of the rotary is an exit road. Accordingly, the driver is not provided with a correct route guidance in a rotary having an exit route advancing inward of the rotary.

In contrast, in the navigation apparatus 1 according to the present embodiment, when an exit road from a rotary exit is a road inside of the rotary, a right/left turn branch display is performed instead of performing a rotary guidance display. Therefore, as illustrated by the thick line arrow in FIG. 3C, only guidance of the right/left turn at the intersection is displayed. This eliminates a mistake, which indicates an incorrect guidance route, undergone in the rotary guidance display. Thus, a driver is enabled to correctly guided in the exit road which advances inward of the rotary.

As explained above, in the case that an exit road of a rotary exit is a road inside of the rotary, a right/left turn branch display is performed instead of performing a rotary guidance display. Thus, a driver is enabled to correctly recognize the exit road which advances inward of the rotary.

Other Embodiments

In the above embodiment, a node is regarded as a determination target point and it is determined whether the determination target point is a rotary entrance or not. In contrast, a determination target point may be set for every distance at equal intervals on a guidance route, and the above determination may be executed.

Further, in the above embodiment, the determination as to whether an exit road of a rotary exit is a road which goes inward of the rotary is performed based on whether the exit route exists within an inside area of the rotary. This is also only one example. For example, the map data may be prepared to be able to indicate a rotary. Each node is designated which links with a segment which can be an exit route in the rotary. Each node is recorded in the map data in association with route information for indicating whether the corresponding exit route is inside of the rotary or outside of the rotary. Thus, reading the route information allows the execution of the above determination.

The above embodiment illustrates an example of a rotary guidance display or a right/left turn branch display in FIGS. 3B, 3C. Without need to be limited to the above, for example, only an arrow having a predetermined shape may be displayed. Further, a right/left turn branch display may be performed while considering the number of lanes etc.

In addition, steps illustrated in FIG. 2 correspond to means to execute various processing. For example, the control section 20 may function as an example of a rotary inside determination means or portion at S130 in FIG. 2. The control section 20 may function as an example of an entrance determination means or portion at S100 in FIG. 2. The control section 20 may function as an example of an exit determination means or portion at S120 in FIG. 2. The control section 20 may function as an example of a rotary guidance display means or portion at S140 in FIG. 2. The control section 20 may function as an example of a right/left turn branch display means or portion at S110, S150 in FIG. 2.

Each or any combination of processes, steps, or means explained in the above can be achieved as a software portion or unit (e.g., subroutine) and/or a hardware portion or unit (e.g., circuit or integrated circuit), including or not including a function of a related device; furthermore, the hardware portion or unit can be constructed inside of a microcomputer.

Furthermore, the software portion or unit or any combinations of multiple software portions or units can be included in a software program, which can be contained in a computer-readable storage media or can be downloaded and installed in a computer via a communications network.

It will be obvious to those skilled in the art that various changes may be made in the above-described embodiments of the present invention. However, the scope of the present invention should be determined by the following claims.

What is claimed is:

1. A navigation apparatus for a vehicle,
the navigation apparatus having a function to perform a route guidance by displaying a guidance route from a departure point to a destination on a map,
the navigation apparatus comprising:
a map data input section configured to input map data stored in a storage medium; and
a control section configured to retrieve as a guidance route a route from the departure point to the destination based on the map data while performing a route guidance relative to the guidance route,
the control section comprising:
a rotary inside determination portion configured to, when a rotary is included in the guidance route, determine whether an exit route, which exits from the rotary, is a road which advances inside of the rotary;
a rotary guidance display portion configured to perform a rotary guidance display for indicating the exit route by using a picture illustrating a configuration of the rotary when it is determined that the exit route is not a road advancing inside of the rotary;
a rotary-use right/left turn branch display portion configured to perform a right/left turn branch display for indicating a right turn or a left turn at an intersection when it is determined that the exit route from the rotary is a road advancing inside of the rotary; and
a non-rotary-use right/left turn branch display portion configured to perform a right/left turn branch display for indicating a right turn or a left turn at an intersection that is other than an intersection of the rotary included in the guidance route, wherein
the rotary-use right/left turn branch display portion performs the right/left turn branch display instead of the rotary guidance display, when it is determined that the exit route from the rotary is the road advancing inside of the rotary, the right/left turn branch display being performed by using a display identical to a right/left turn branch display for indicating a right turn or a left turn at an intersection that is other than an intersection of the rotary included in the guidance route.

2. The navigation apparatus according to claim 1,
the control section being further comprising:
an entrance determination portion configured to determine whether a determination target point is a rotary entrance, the determination target point being a point defined by tracing the guidance route forward towards the destination; and
an exit determination portion configured, when it is determined that the determination target point is the rotary entrance, to determine whether there is a rotary exit, which is an end point of a portion of the rotary included in the guidance route when the rotary entrance is a start point of the portion of the rotary included in the guidance point,
the rotary inside determination portion being further configured to determine whether the exit route from the rotary is a road advancing inside of the rotary when it is determined that there is the rotary exit.

3. The navigation apparatus according to claim 1,
the control section being further configured,
when the right/left turn branch display is performed by the right/left turn branch display portion, to output a signal to a sound generation section, the signal causing the sound generation section to perform an audio guidance for indicating a branch of a right turn or left turn corresponding to the right/left turn branch display.

4. The vehicular navigation apparatus according to claim 1,
the control section being further configured,
when the right/left turn branch display is performed by the right/left turn branch display portion,
to output a signal to a sound generation section, the signal causing the sound generation section to perform an audio guidance for indicating that the vehicle will enter a rotary.

5. A method for navigating a vehicle, using a vehicular navigation apparatus, along a guidance route including a rotary based on map data, the method comprising:
determining, when a rotary is included in the guidance route, whether an exit route, which exits from the rotary, is a road which advances inside of the rotary;
performing a rotary guidance display for indicating the exit route by using a picture illustrating a configuration of the rotary when it is determined that the exit route is not a road advancing inside of the rotary; and
performing a right/left turn branch display for indicating a right turn or a left turn at an intersection when it is determined that the exit route from the rotary is a road advancing inside of the rotary;
wherein the right/left turn branch display is performed by using a display identical to a right/left turn branch display for indicating a right turn or a left turn at an intersection that is other than an intersection of the rotary included in the guidance route, and the right/left turn branch display does not contain a picture illustrating a configuration of a rotary, when it is determined that the exit route from the rotary is the road advancing inside of the rotary.

* * * * *